United States Patent
Freedman et al.

(10) Patent No.: US 10,872,085 B2
(45) Date of Patent: Dec. 22, 2020

(54) RECORDING LINEAGE IN QUERY OPTIMIZATION

(71) Applicant: Microsoft Technology Licensing, LLC, Redmond, WA (US)

(72) Inventors: Craig Steven Freedman, Sammamish, WA (US); Vasileios Papadimos, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 16/179,434

(22) Filed: Nov. 2, 2018

(65) Prior Publication Data

US 2020/0142990 A1 May 7, 2020

(51) Int. Cl.
*G06F 16/2452* (2019.01)
*G06F 16/2453* (2019.01)
*G06F 16/2455* (2019.01)

(52) U.S. Cl.
CPC .... *G06F 16/24542* (2019.01); *G06F 16/2454* (2019.01); *G06F 16/2455* (2019.01); *G06F 16/24547* (2019.01)

(58) Field of Classification Search
CPC .................................................. G06F 16/2452
USPC ................................. 707/602, 760, 999.004
See application file for complete search history.

(56) References Cited

U.S. PATENT DOCUMENTS

| | | | |
|---|---|---|---|
| 6,466,931 B1 | 10/2002 | Attaluri | |
| 6,850,925 B2 | 2/2005 | Chaudhuri | |
| 7,185,000 B1 | 2/2007 | Brown | |
| 7,464,071 B2 | 12/2008 | Galindo-Legaria | |
| 7,877,381 B2 | 1/2011 | Wen | |
| 7,966,313 B2 | 6/2011 | Bruno | |
| 8,122,050 B2 | 2/2012 | Mordvinov | |
| 8,190,595 B2 | 5/2012 | Bruno | |
| 2005/0283458 A1* | 12/2005 | Galindo-Legaria | ..... G06F 16/22 |
| 2008/0256024 A1 | 10/2008 | Downer et al. | |
| 2010/0106480 A1* | 4/2010 | Sadamasa | ............... G06F 40/56 704/2 |
| 2010/0306188 A1 | 12/2010 | Cunningham | |

(Continued)

OTHER PUBLICATIONS

"International Search Report and Written Opinion Issued in PCT Application No. PCT/US2019/058416", dated Mar. 6, 2020, 16 Pages.

(Continued)

*Primary Examiner* — Baoquoc N To
(74) *Attorney, Agent, or Firm* — Fiala & Weaver P.L.L.C.

(57) ABSTRACT

A database system includes a query optimizer which applies transformations to a logical representation of an input query in a declarative query language to generate expressions for a query execution plan. The query optimizer stores information, for each rule application, indicating a transformation applied and bindings for the transformation, the bindings indicating expressions input to the transformation. When a new query execution plan is to be generated for the input query, the query optimizer uses this stored information, for expressions in an original query execution plan, to guide the query optimizer to produce a current query execution plan while avoiding transformations not used to generate expressions in the original query execution plan.

20 Claims, 7 Drawing Sheets

(56) References Cited

U.S. PATENT DOCUMENTS

2011/0137922 A1 6/2011 Cushing et al.
2014/0114952 A1 4/2014 Robinson

OTHER PUBLICATIONS

Corlatan, Costel Gabriel et al. "Query Optimization Techniques in Microsoft SQL Server", in Database Systems Journal, vol. V, No. 2, 2014, pp. 33-48.

Gu, Zhongxian et al., "Testing the Accuracy of Query Optimizers", DBTest '12 Proceedings of the Fifth International Workshop on Testing Database Systems Article No. 11, May 2012, 6 pages.

Freytag, Johann, "A Rule-Based View of Query Optimization", SIGMOD '87 Proceedings of the 1987 ACM SIGMOD international conference on Management of data, vol. 16 Issue 3, Dec. 1987, pp. 173-180, 8 pages.

Bruno, Nicolas et al., "Interactive Plan Hints for Query Optimization", SIGMOD '09 Proceedings of the 2009 ACM SIGMOD International Conference on Management of data, 2009, pp. 1043-1046.

Graefe, Goetz, "The Cascades Framework for Query Optimization", Data Engineering Bulletin, vol. 18, 1995, 10 pages.

Chaudhuri, Surajit, "An Overview of Query Optimization in Relational Systems", in PODS '98 Proceedings of the seventeenth ACM SIGACT-SIGMOD-SIGART symposium on Principles of database systems, 1998, pp. 34-43.

Kossmann, Donald et al., "Iterative Dynamic Programming: A New Class of Query Optimization Algorithms", Journal ACM Transactions on Database Systems (TODS), vol. 25, Issue 1, Mar. 2000, pp. 43-82.

Liu, Mengmeng, et al., "Enabling Incremental Query Optimization", Proceedings SIGMOD '16:Proceedings of the 2016 International Conference on Management of Data, 2016, pp. 1705-1720.

Selinger, P. Griffiths et al., "Access Path Selection in a Relational Database Management System", SIGMOD '79: Proceedings of the 1979 ACM SIGMOD international conference on Management of data, 1979, pp. 23-34.

Gawade, Mrunal et al., "Stethoscope: A Platform for Interactive Visual Analysis of Query Execution Plans", Proceedings of the VLDB Endowment, vol. 5, Issue 12, Aug. 2012, pp. 1926-1929.

Shankar, Srinath et al., "Query Optimization in Microsoft SQL Server PDW", SIGMOD '12:Proceedings of the 2012 ACM SIGMOD International Conference on Management of Data, 2012, pp. 767-776.

\* cited by examiner

Select * from table 1 joint table 2 on table1.a = table2.b    /-300

Initial Memo Table

| Group | Expression |
|---|---|
| Group 5 (root) | Join 3 4 2, Join 4 3 2 |
| Group 4 | Get table1 |
| Group 3 | Get table2 |
| Group 2 | = 0 1 |
| Group 1 | Identifier a |
| Group 0 | Identifier b |

Lineage Node 350

Task Number 352 (e.g., 1)
Rule Number 354 (e.g., 1)
Bindings 356 (e.g., 5.1)
Outputs 360 (e.g., 5.2)

FIG. 3

Recorded Lineage 402

|   | Rule | Binding | Output |
|---|---|---|---|
|   | 26 | 7.0, 3.0, 6.0, 2.0 | 7.1 |
| * | 45 | 6.0, 5.0, 4.0 | 8.0 |
| * | 26 | 8.0, 5.0, 4.0 | 8.1, 5.1 |
| * | 34 | 7.0, 3.0, 8.0 | 7.2 |
|   | 26 | 7.2, 3.0, 8.0 | 7.3 |
|   | 107 | 7.0 | 7.4 |
|   | 65 | 8.0 | 8.2 |
| * | 83 | 5.0 | 5.2 |
|   | 193 | 5.0 | 5.3 |
| * | 201 | 4.0 | 4.1 |
| * | 54 | 3.0 | 3.1 |
| * | 257 | 8.0 | 8.3 |
|   | ... | ... | ... |
| * | 97 | 7.2, 8.1, 4.0, 5.0, 3.0, 2.0, 1.0 | 7.5 |

Memo Table 404

| Group | Expression |
|---|---|
| 8 | 8.1, 8.2, 8.3, 8.4 |
| 7 | 7.1, 7.2, 7.3, 7.4, 7.5 |
| 6 | 6.1, 6.2 |
| 5 | 5.1, 5.2, 5.3 |
| 4 | 4.1 |
| 3 | 3.1 |
| 2 | 2.1, 2.2 |
| 1 | 1.1 |

Query Execution Plan 400

FIG. 4

RECORDING LINEAGE IN QUERY OPTIMIZATION

BACKGROUND

Most current database systems allow a user to specify a query in a declarative or non-procedural language, such as the structured query language (SQL). A declarative language specifies the conditions that database records must meet to be responsive to the query. When a query is specified in this manner, the database system translates the query into a set of operations, typically called a "query execution plan", which are executed on the database to perform that query. Generally, a query is transformed into a tree or graph representation, which in turn is used to generate the query execution plan. These operations are generally in the form of a procedural computer language. There are many possible operations, and possible combinations of operations, which can be performed to implement any given query, some of which are more efficient than others. The database system therefore attempts to find an optimal, or at least a reasonably efficient, combination of operations as the query execution plan for a given query. This process is called "query optimization".

In query optimization, the possible combinations of operations generally can be considered a tree or graph which defines a search space for the optimization process. Some queries can have thousands or even more possible implementations.

Query optimization, therefore, is a form of search over a large search space to find an optimal, or reasonably efficient, solution. As such, some approaches to query optimization are top-down searches, whereas some are bottom-up searches; some approaches are depth-first searches, whereas others are breadth-first searches. Many techniques for query optimization have been used in various database systems. Generally, the result of query optimization is a tree or graph representation of a combination of database operations which maps to a similar tree or graph representation of the query.

The query is parsed to generate an initial representation of the query, typically as a tree. In a rule-based, top-down approach to query optimization, this initial tree is transformed by applying transformation rules. A transformation rule may provide an alternate logically equivalent representation of the query. A transformation rule may provide a possible operation to implement a part of the query. Yet other approaches to query optimization, such as a bottom-up approach, can use different logical representations of the input query, to which transformations are applied to explore the search space. The types of transformations used generally are dependent on the logical representation of the query and the type of search space exploration used. The result of applying such transformations is many alternatives for implementing the query. These alternatives are evaluated for their likely performance impact or cost of computation. Such evaluation is performed during the process of query optimization and generally results in pruning some transformations from further use in exploration of the search space. Applying all available transformations, with multiple invocations of such transformations, could result in a very large set of possible combinations of operations to implement the query.

Query optimization consumes significant processing resources of the database system. Query optimization time increases exponentially with the size and complexity of the query. Query execution plans also can consume a significant amount of memory. While some database systems cache query execution plans, a query execution plan may need to be recomputed for a query if, for some not uncommon reasons, the query execution plan is no longer in the cache. For example, a replacement strategy for a cache may cause a query execution plan to be removed from the cache. As another example, in response to a system restart, the cache may be emptied, and a database system may perform query optimization for several queries before re-starting those queries. As another example, when statistics about database performance are updated, these statistics may affect the estimated costs for possible combinations of operations, and the database system may perform query optimization again.

SUMMARY

This Summary is provided to introduce a selection of concepts in a simplified form that are further described below in the Detailed Description. This Summary is intended neither to identify key or essential features, nor to limit the scope, of the claimed subject matter.

A query optimizer records, for each possible expression generated by a transformation, data indicating the transformation and inputs that generated the expression. When a set of expressions is selected as the query execution plan, the transformations used to generate those expressions can be identified. When the query optimizer processes the query a second time, the recorded data, about the transformations and inputs which were used to generate an original query execution plan, can be used to guide the optimization process to produce the original query execution plan a second time.

In the following description, reference is made to the accompanying drawings which form a part hereof, and in which are shown, by way of illustration, specific example implementations. Other implementations may be made without departing from the scope of the disclosure.

BRIEF DESCRIPTION OF THE DRAWINGS

FIG. 3 is a diagram of an illustrative example of data structures used in query optimization.

FIG. 4 is a diagram of an illustrative example of instances of data structures generated for a query execution plan.

DETAILED DESCRIPTION

Figure 1:
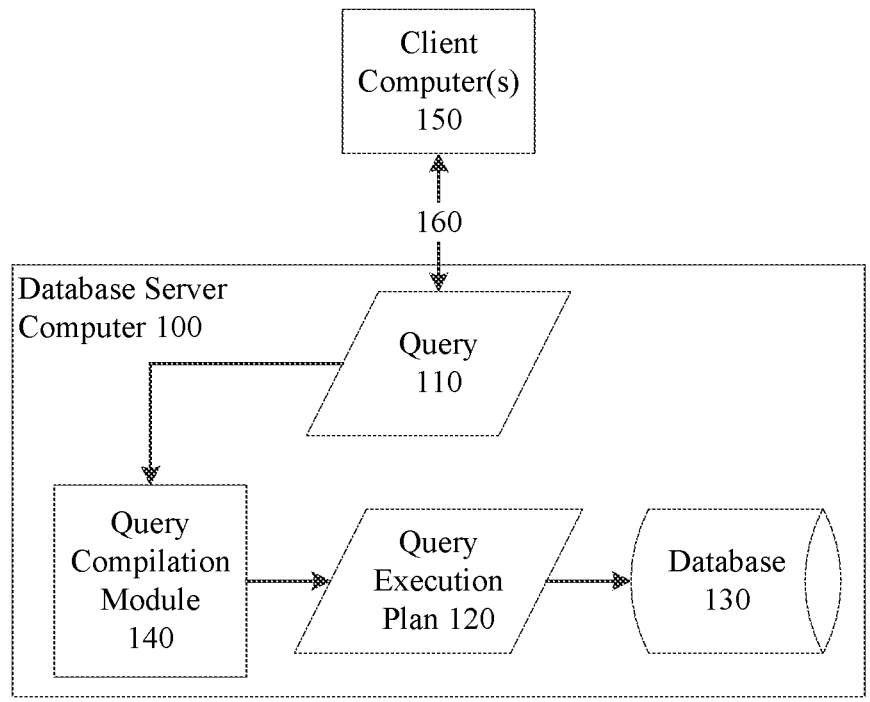
FIG. 1 is a block diagram of an example computing environment including a database system that performs query optimization.

FIG. 1 is a block diagram of an example computing environment including a database system that performs query optimization.

In FIG. 1, a database server computer 100 supports a database 130 and includes a query processing module 140. The query processing module 140 is responsive to queries 110 from applications (not shown) on client computers 150 to process a query 110 into a query execution plan 120 executed on the database 130. There may be many client computers 150 and many queries 110. The query processing module 140 may include a variety of subsystems responsible for managing access to the database, managing receiving queries, managing transmission of responses to queries, and the like. The primary focus of this document is those operations of the query processing module which convert a query into a query execution plan.

Figure 8:
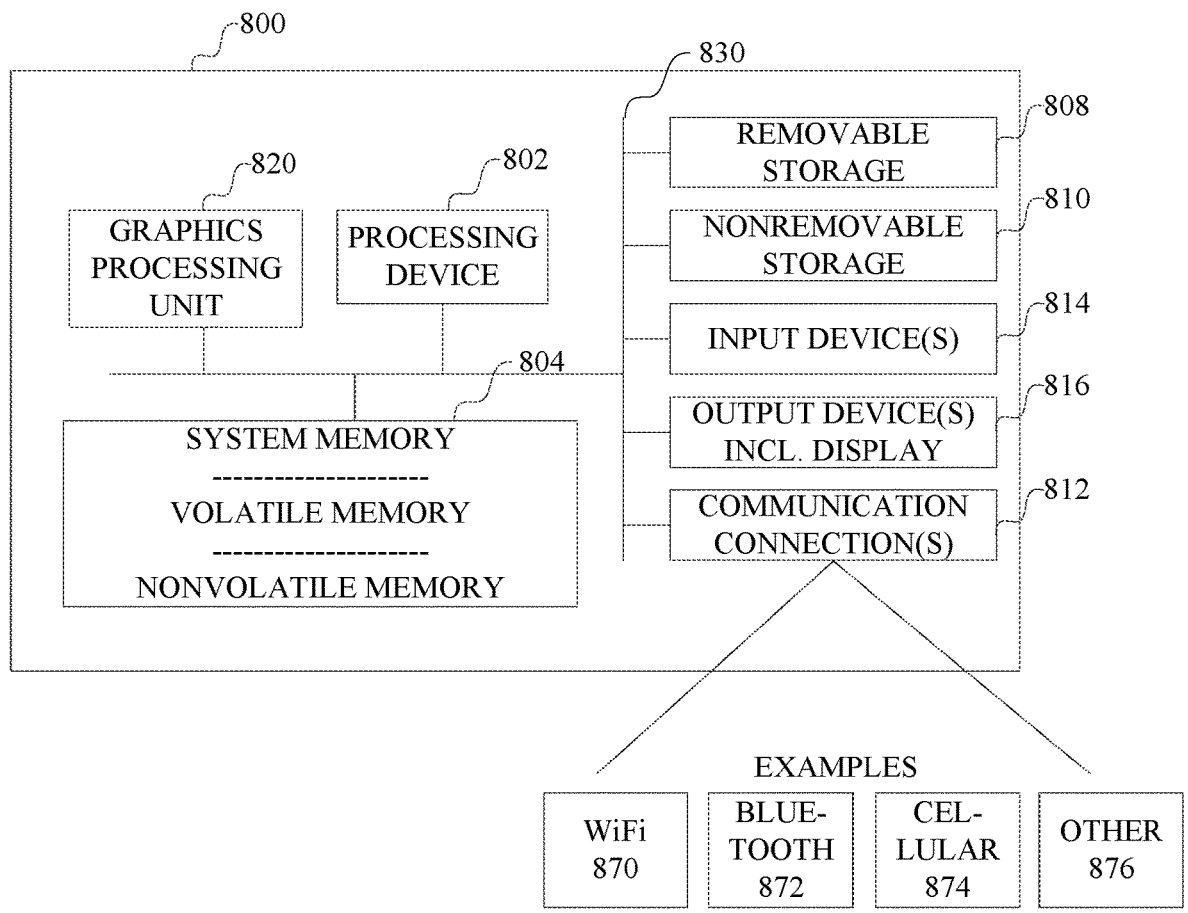
FIG. 8 is a block diagram of an example computer.

The database server computer 100 generally can be implemented using a computer such as described in FIG. 8 and configured to support operation as a server. Client computers 150 generally can be implemented using a computer such as described in FIG. 8 and can include any of a variety of computer configurations, including but not limited to, other server computers, desktop computers, laptop computers, notebook computers, mobile computers, tablet computers, slate computers, set top boxes, game consoles, and mobile phones.

The query 110 is specified in a declarative or non-procedural language, such as the structured query language (SQL). A declarative language specifies the conditions that database records must meet to be responsive to the query but is not in the form of operations executed on the database 130. The query compilation module 140 translates the query 110 into a set of operations called a "query execution plan". The database server computer 100 executes the query execution plan 120 on the database 130. Generally, a query is transformed into a tree or graph representation, which in turn is used to generate the query execution plan. The operations in the query execution plan are generally in the form of a procedural computer language.

Typically, client computers 150 access the database server computer 100 over one or more computer networks 160. The computer network 160 can be any computer network supporting interaction between the client computers 150 and the database server computer 100, such as a local area network or a wide area network, whether private and/or publicly accessible, and can include wired and/or wireless connectivity. The computer network 160 can be implemented using any of several available network communication protocols, including but not limited to Ethernet and TCP/IP.

An example implementation of the database server computer 100, and particularly the query compilation module 140, will now be described in connection with FIGS. 2-7. This description is only for an example implementation for the purposes of illustration and is not intended to be limiting in any respect. Many other implementations are possible.

Figure 2:
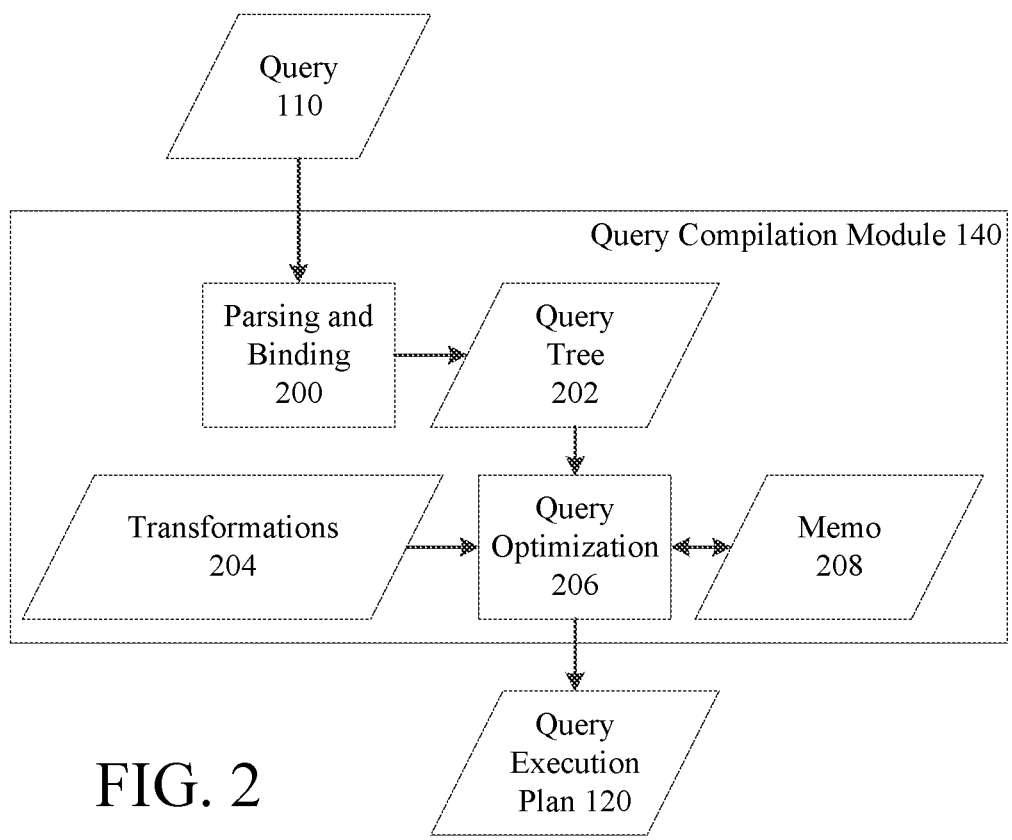
FIG. 2 is a data flow diagram of an example implementation of query optimization.

Referring now to FIG. 2, the query compilation module 140 includes a parsing and binding module 200 which converts the query into a logical representation of the input query, herein called a query tree 202. The query tree 202 may be represented using any data structure commonly used to represent a tree or graph. While the term "query tree" is used, the data structure is not limited to tree data structures. For example, a directed acyclic graph may be used.

A query optimization module 206 processes the query tree 202 by applying transformations 204. A transformation may provide an alternate logically equivalent representation of the query tree 202, or of a portion of the query tree. A transformation may provide a possible operation to implement a part of the query, as a specific implementation of one of the nodes of the query tree 202. The results of transformations are herein called "expressions". The various alternatives of the query tree 202 or of portions of it created by application of the transformations 204 are evaluated for their likely performance impact or cost of computation. The best combination of alternatives is selected to generate the query execution plan 120.

Query optimization is a form of search over a large search space to find an optimal, or reasonably efficient, solution. As such, some approaches to query optimization are top-down searches, whereas some are bottom-up searches; some approaches are depth-first searches, whereas others are breadth-first searches.

Many techniques for query optimization have been used in various database systems. In the following description, one example type of query optimization, which is a form of top-down search, will be described. This technique is based on what is called the "Cascade" framework described, for example, in "The Cascades Framework for Query Optimization", by Goetz Graefe, in Data Engineering Bulletin, Vol. 18, 1995, and hereby incorporated by reference. This technique makes use of a "memo table" data structure 208, an example of which is described in more detail below and involves the application of transformation rules to the input query. Yet other approaches to query optimization can use different logical representations of the input query, to which transformations are applied to explore the search space. A transformation can be any operation that generates data specifying one or more equivalents of a portion of a query. The types of transformations used generally are dependent on the logical representation of the query and the type of search space exploration used.

The query optimization module 206 records, for each possible expression generated by a transformation 204, data indicating the transformation that generated the expression. In the example implementation of FIGS. 2-7, this data is stored as part of the memo table 208.

Using other techniques for query optimization, other data structures may be used to explore the search space of possible combinations of operations for producing a query execution plan. With these other techniques for query optimization, a similar technique of recording steps taken in this search process, herein called recording the lineage of the query optimization plan, also can be used with similar effect. This data can otherwise be stored as a part of, or in association with, the data structure used to represent the input query as transformed throughout the process of query optimization, depending on the implementation.

Turning now to FIG. 3, an example implementation of a memo table 208 will now be described in the context of an illustrative example of a simple query. In FIG. 3, the illustrative example query 300 is "Select * from table 1 join table 2 on table1.a=table2.b". The result of such a query is to return a set of records which result from a join of a first table ("table1") and a second table ("table2") where the value in a first field ("a") in the first table equals the value in a second field ("b") in the second table.

The query optimizer parses this query and initializes a memo table 208 representing a query tree corresponding to this query. The memo table includes groups 302. Within each group, the memo table 208 includes expressions 304. A group 302 represents a part of the query. An expression can be a logical representation of a part of the query or can represent a database operation that performs that part of the query. All the expressions in a single group are logically equivalent alternatives of that group. An expression generally includes data specifying an operation, e.g. "Join" at 306, and data specifying one or more operands on which the operation is performed, by reference to a group or group expression, e.g., "3 4 2" at 308.

In the example in FIG. 3, "table2.b" in the query corresponds to Group 0, "table1.a" corresponds to Group 1. Their combination in the query 300, "table1.a=table2.b" is represented by Group 2, "=0 1", where "=" is the operator and "0 1" are the two operands, referring to Groups 0 and 1. Thus, any of the variety of ways that can be used to implement the operation "=" can be applied to any of the variety of ways in which the values for the expressions in Groups 0 and 1 can be obtained. Similarly, "table1" and "table2" become Group 4 and Group 3, respectively, and represent the variety of ways of retrieving the contents of "table1" and "table2". Group 5 represents the "join" operation, for which the operands are "3 4 2", indicating the join operation is applied to Groups 3 and 4, with the condition specified by Group 2. To provide an example convention for referencing each expression, expressions within a group can be ordered and numbered consecutively using positive integers; similarly, groups can be ordered and numbered consecutively. Thus, the first expression "Join 3 4 2" in Group 5 can be referred to as expression "5.1".

Transformation rules are applied to the memo table to transform groups and expressions into additional alternative representations of the groups and expressions. As an example, due to a commutativity rule, "Join 3 4 2" also can be represented as "Join 4 3 2". This expression can be added to Group 5 as an alternative representation of an expression in Group 5 and can be referred to as expression "5.2".

Such a memo table 208 can be represented by a collection, such as an ordered array, of groups, where each group is a collection, such as an ordered array, of expressions. Expressions include data representing an operation and data representing its operands. The operands can refer to other groups or expressions by reference to an identifier of the group or expression. The identifier may be explicitly stored in the memo table as part of the data representing a group or expression, or may be inferred (e.g., it is an index), due to the structure of the memo table.

As noted above, the query optimization module 206 records, for each possible expression generated by a transformation 204, data indicating the transformation that generated the expression. Using the illustrative example of FIG. 3, assume that the commutativity rule was assigned an identifier, e.g., "Rule 1". This rule was applied to the first expression in Group 5, i.e., expression "5.1", and resulted in the expression now labeled as expression "5.2". Thus, the data representing expression "5.2" can be augmented to include the data indicating how the expression was generated, i.e., "Rule 1" applied to expression "5.1".

A variety of different data structures can be used to store data indicating how each expression was generated, also referred to herein as recording the "lineage" of the query optimization plan for a query. In one implementation, the memo table 208 further includes a data structure called a lineage node. In an object-oriented implementation, this data structure can be defined as a lineage node class, and an instance of this class is generated for each application of a transformation rule which results in a new expression in the memo table. Each expression in the memo table that is created by application of a transformation rule refers to the lineage node instance representing that application of the transformation rule. A collection of lineage nodes describes all transformation rules applied during a phase of query optimization.

In an example implementation, shown at 350 in FIG. 3, a lineage node data structure can store the following information: a task number 352 of a task in the query optimization process which generated the node, a rule number 354 of the transformation rule used by that task, a list 356 of expressions that were the bindings of the transformation rule that made the lineage node object, and group and expression numbers 360 of expressions produced from applying the transformation rule. Similar information can be stored for other types of transformations.

Using the example from above, if the first task of query optimization was to apply the commutativity rule to join expressions (labeled as rule "1"), then an instance of a lineage node would be created where task number 352 is "1", rule number 354 is "1", the binding 356 is "5.1" for the first expression in Group 5, and the output 360 is the second expression in Group 5, which is now labelled expression "5.2".

After query optimization, as noted above in FIG. 2, a query execution plan can be generated. By recording the lineage used by the query optimizer to explore the search space for generating this query execution plan, the query optimization process can provide data that can be used by the query optimizer to regenerate the query execution plan for the query without exploring the search space again.

The recorded lineage generated for a query by the query optimizer can be used in a variety of ways. For example, the system can track data about the transformations that have been used by the query optimizer which result in expressions used in optimized query execution plan. The system can identify transformations which resulted in the expressions that are used to generate the selected query execution plan. These identified transformations can be extracted from the recorded lineage. The query optimizer can use this extracted information to direct the query optimization process when re-processing the query. For example, the query optimizer can limit the application of transformations to only those transformations which resulted in the original query execution plan. Herein, this process is called "optimization replay".

To illustrate optimization replay in the context of the example implementation of FIGS. 2 and 3, an illustrative example of a combination of operations for a query execution plan, and a corresponding memo table including groups, expressions, and collection of lineage nodes, will now be described in connection with FIG. 4. In this example, the query execution plan is represented by the tree 400, which includes a combination of expressions 1.1 and 2.2, which are combined by expression 3.1; and expression 5.2 and 4.1, which are combined by expression 8.3; and expression 7.5 which combines expressions 3.1 and 8.3. The collection 402 of lineage nodes illustrates an extract of the transformation rules that were applied to result in some of the expressions in the memo table 404 (this example does not include the tasks and transformation rules resulting in expressions 1.1, 2.1, 2.2, 6.1 and 6.2).

From inspection of the collection of lineage nodes 402, we can identify the transformation rules (labeled with a "*") which resulted either directly in the creation of the expressions in the query execution plan, or indirectly by creating an expression that ultimately was used in a binding for a transformation rule that created the expression.

Figure 5:
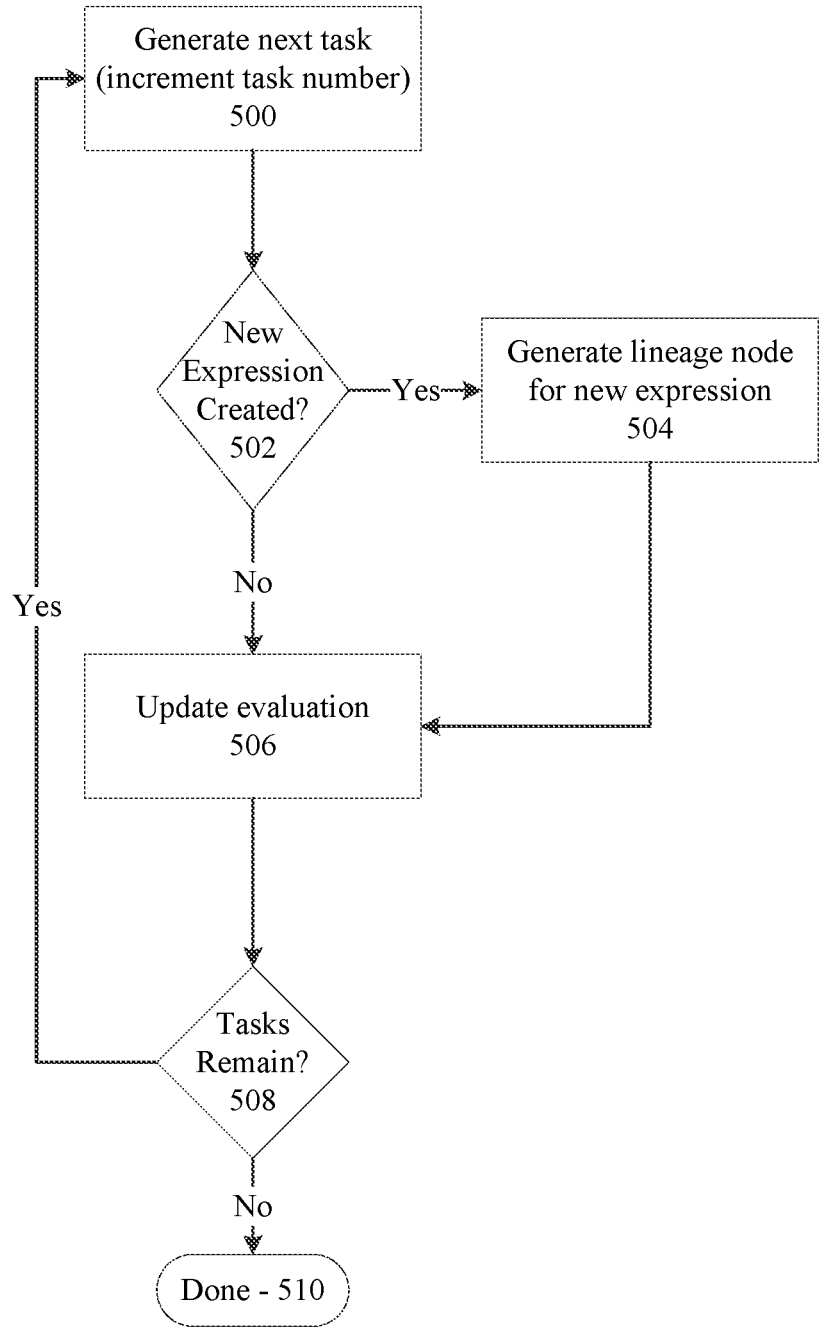
FIG. 5 is a flowchart describing operation of an example illustrative implementation of the generation of the collection of lineage nodes during query optimization.

Turning now to FIG. 5, a flowchart describing operation of an example illustrative implementation of the generation of the collection of lineage nodes during query optimization will now be described in the context of the implementation of FIGS. 2 and 3.

In query optimization, a collection of tasks is performed to generate and evaluate alternatives by applying transformations, which in this example are transformation rules. As shown in FIG. 5, for each new task to be performed, the query optimizer increments a task number 502. If the task results in the creation of a new expression, as determined at 502, a corresponding lineage node is created 504 for the new expression, given the task number, the rule number of the transformation rule applied in the task, and the bindings for the transformation rule as applied. The query optimization continues, for example, by updating (506) any information about the ongoing evaluation of the query execution plan. If tasks remain to be processed, as determined at 508, the next task is processed by repeating steps 500-508, and then terminating when complete (510).

Figure 6:
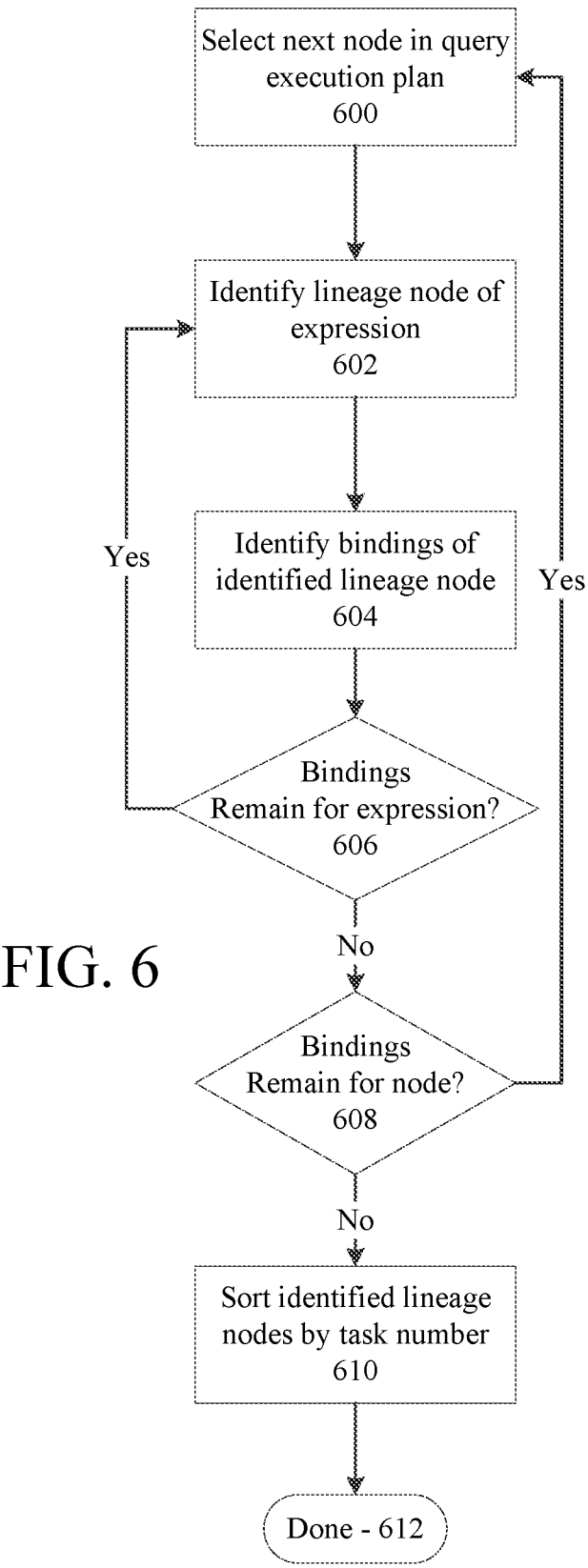
FIG. 6 is a flowchart describing operation of an example illustrative implementation of the extraction of transformations applied to create the expression in a query execution plan from a collection of lineage nodes.

Turning now to FIG. 6, a flowchart describing operation of an example illustrative implementation of the extraction of transformations used to create the expression in a query execution plan from a collection of lineage nodes will now be described.

There are several ways in which lineage nodes in the collection of lineage nodes can be identified as corresponding to transformations used to generate an expression in a query execution plan. The process is a form of search of the collection of lineage nodes: given an expression, identify the set of transformations used to generate, directly and indirectly, that expression.

In FIG. 6, a depth-first, top-down search of the query execution plan is described. Alternatively, a breadth-first search can be performed, and searches can be performed in a top-down or bottom-up manner. The process begins with selecting (600) the next node, initially the root node, of the query execution plan, e.g., the root node (expression "7.5") of plan 400 in FIG. 4. The lineage node (e.g. the last lineage node in 402, which output expression "7.5") corresponding to the expression for the selected node is identified (602), and can be tracked, for example by adding the task number to a list or marking the lineage node with some tracking data. The expression(s) in the bindings of the identified lineage node (e.g., the expressions "7.2, 8.1, 4.0, 5.0, 3.0, 2.0, 1.0") are identified 604. The steps of identifying a lineage node (602) and identifying bindings (604) repeats (as indicated at 606) for each expression that was used as a binding in the lineage node for the currently selected node of the query execution plan. As indicated at 608, this processing of steps 602-606 repeats for each node of the query execution plan (e.g, after processing node "7.5" in the query execution plan using steps 602-606, node "3.1" in the query execution plan is processed). After all nodes of the query execution plan have been processed, all the lineage nodes used to produce the expressions in the query execution plan have been identified. This set of identified lineage nodes can be sorted 610 by task number, before terminating this process (612).

There are many options for storing the recorded lineage data that corresponds to a selected query execution plan. In one implementation, a collection of lineage node data structures can be stored as a set of key-value pairs in an eXtensible Markup Language (XML) document. This XML document can be a document that includes all of the operators and expressions in the selected query execution plan, which can be augmented to include their corresponding lineage information. In some implementations, such an XML document representing the query execution plan with embedded lineage information can be used for other purposes, such as to provide hints to query optimization or to force a query optimizer to produce a plan. Such data about the recorded lineage can be stored persistently by the database system.

Figure 7:
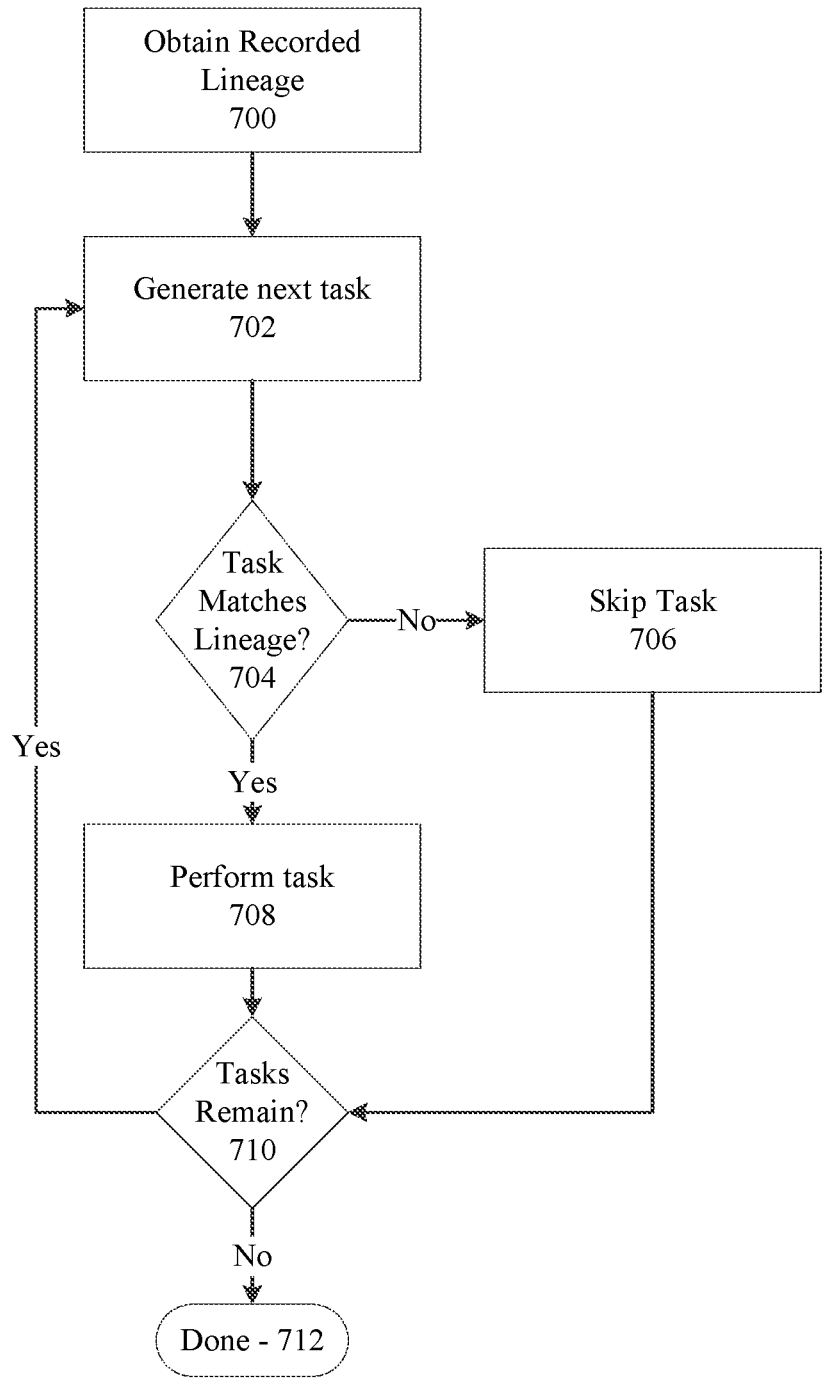
FIG. 7 is a flowchart describing operation of an example illustrative implementation of optimization replay, limiting transformations applied by the query optimizer based on a recorded lineage for a prior-computed query execution plan.

Turning now to FIG. 7, a flowchart describing operation of an example illustrative implementation of optimization replay, limiting application of transformations by the query optimizer based on a recorded lineage for a prior-computed query execution plan, will now be described. As noted above, a typical query optimization involves computation time and resource usage that is exponential with the complexity of the query. By using the extracted data from the lineage nodes corresponding to a query execution plan, the operation of the query optimizer can be limited to applying only those transformations that generated the expressions from the original query execution plan.

The re-use of only the applied transformations that resulted in a selected query execution plan is generally dependent upon implementation of the query optimizer and the information stored in the recorded lineage. If enough information is stored about the applied transformations, along with sufficient state information about the query optimizer when those transformations were applied, the recorded lineage could be simply executed within the query optimizer, directing the query optimizer to perform the selected transformations. In some implementations, the query optimizer can perform its usual optimization process but uses the recorded lineage to skip tasks that were not used to arrive at the query execution plan.

In one implementation, to use the recorded lineage, the second time the query optimizer is run for a query, the query optimizer obtains (700) the recorded lineage containing data about the prior applied transformations which resulted in the prior query execution plan for that query. The query optimizer then proceeds with its process of creating tasks to apply the transformations. As shown in FIG. 7, for each new task generated (702), the query optimizer compares 704 that task to the recorded lineage. If the task is in the recorded lineage, that task is performed 708, e.g., its transformation rule is applied to generate the corresponding expression. To verify that the task will apply a transformation that is in the recorded lineage for the prior-computed query execution plan, in the example implementation of FIGS. 2-6, the query optimizer can compare the rule number and the bindings of the task to the rule number and bindings of a lineage node. If both the rule number and bindings match, then the task can be performed. Otherwise, that task is not performed 706, e.g., its transformation rule is not applied or is skipped. The query optimization continues: if tasks remain to be processed, as determined at 710, the next task is processed by repeating steps 702-708; otherwise the process terminates at 712.

In some instances, the application of a transformation, such as a transformation rule, in a subsequent replay of query optimization may result in an expression having a different identifier in the optimization replay than in the original optimization. For example, in the optimization replay, a transformation may be skipped. Thus, in the original optimization, as an example, groups 8.1, 8.2 and 8.3 may be generated, but in the optimization replay, the transformation that originally generated group 8.2 might be skipped, resulting in a new numbering of group 8.3 as group 8.2. To address this issue, the optimization replay process can maintain a mapping of expressions used between the original optimization and the optimization replay. When a new expression is generated in the optimization replay, a corresponding entry can be entered in this mapping between the expression identifier for that expression from the original optimization and the new expression identifier for that expression in the later optimization replay. When the check is performed on a task to verify the rule and bindings (e.g. 704 in FIG. 7), the verification of the bindings can use this mapping.

In some implementations of query optimization, the application of a first transformation may queue an application of a second transformation. If application of the first transformation is omitted when optimization is replayed based on a recorded lineage, then the second transformation may not be queued for application. If expressions generated by application of the second transformation are used in the query execution plan, and if the query optimizer upon optimization replay skips the first transformation, and subsequently never queues application of the second transformation, then the query optimizer may fail. Similarly, query optimization can be performed in phases and a similar scenario may arise due to some transformations being performed in different optimization phases or behaving differently in different optimization phases.

There are several ways to address such scenarios. In some implementations, the query optimizer can simply restart and generate a new query optimization plan without any recorded lineage information. In some implementations, the recorded lineage can include information about dependencies among transformations, such that the record lineage indicates that second transformation is dependent upon application of the first transformation. For example, a "dummy" transformation rule can be stored to indicate that the result of a transformation rule is not used, but its side effect of triggering another transformation rule is used. In some implementations, the recorded lineage can include information about optimization phases in which the transformations are applied.

By recording the lineage of transformations evaluated by the query optimization process for a query, a subsequent query optimization performed for that query can be transformed into a process for which resource consumption is linear with respect to the size of the query, instead of exponential. If an attempt to replay the query optimization using the recorded lineage fails, standard query optimization can be performed. Another scenario for which the recorded lineage can be used is to reduce the memory consumed by caching a query optimization plan and/or to create a cache of the optimization replay steps instead of the query optimization plan. Such a cache can be stored persistently, e.g., on disk storage, and can be larger than the available memory.

Another scenario for which a recorded lineage can be used is for allowing optimization replay to be performed on a database server computer other than the database server computer that performed the initial query optimization. In some cases, the recorded lineage can be used to "force" the plan. Recompiling due to a statistics update also can be performed, even if the query execution plan was still cached, because recompiling can yield updated cardinality estimates which could be used to adjust resource grants (e.g., memory). Yet another use of the recorded lineage is to recompute costs for an existing query execution plan to determine whether the plan is still valid for a different set of parameter values.

Having now described an example implementation, FIG. 8 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 8, a computer 800 includes a processing system comprising at least one processing device 802 and at least one memory 804. The processing device 802 can include multiple processing devices; the memory 804 can include multiple memory devices. A processing device 802 comprises a processor which is logic circuitry which responds to and processes instructions to provide the functions of the computer. A processing device can include one or more processing cores (not shown) that are multiple processors within the same logic circuitry that can operate independently of each other. Generally, one of the processing devices in the computer is designated as a primary processor, typically called the central processing unit (CPU). One or more additional co-processing units, such as a graphics processing unit (GPU) 820, also can be present in the computer. A co-processing unit comprises a processor that performs operations that supplement the central processing unit, such as but not limited to graphics operations and signal processing operations.

The memory 804 may include volatile computer storage devices (such as dynamic random-access memory (DRAM) or other random-access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 800 can include additional computer storage devices (whether removable or non-removable) such as, but not limited to, magnetically-recorded or optically-recorded disks or tape. Such additional computer storage devices are illustrated in FIG. 8 by removable storage device 808 and non-removable storage device 810. Such computer storage devices 808 and 810 typically are nonvolatile storage devices. The various components in FIG. 8 are generally interconnected by an interconnection mechanism, such as one or more buses 830.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 804, removable storage 808 and non-removable storage 810 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 800 may also include communications connection(s) 812 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 812 are devices, such as a wired network interface, wireless network interface, radio frequency transceiver, e.g., Wi-Fi 870, cellular 874, long term evolution (LTE) or Bluetooth 872, etc., transceivers, navigation transceivers, e.g., global positioning system (GPS) or Global Navigation Satellite System (GLONASS), etc., transceivers, and network interface devices 876, e.g., Ethernet, etc., or other device, that interface with communication media to transmit data over and receive data from signal propagated over the communication media.

The computer 800 may have various input device(s) 814 such as a pointer device, keyboard, touch-based input device, pen, camera, microphone, sensors, such as accelerometers, thermometers, light sensors and the like, and so on. The computer 800 may have various output device(s) 816 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 808 and 810, communication connections 812, output devices 816 and input devices 814 can be integrated within a housing with the rest of the computer, or can be connected through various input/output interface devices on the computer in which case the reference numbers 808, 810, 812, 814 and 816 can indicate either the interface for connection to a device or the device itself.

A computer generally includes an operating system, which is a computer program that, when executed, manages access, by other applications running on the computer, to the various resources of the computer. There may be multiple applications. The various resources include the processing devices, coprocessing units, memory, storage, input devices and output devices, such as display devices and input devices as shown in FIG. 8. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. A file system generally provides operations such as creating a file, opening a file, writing a file or its attributes, reading a file or its attributes, and closing a file.

The various modules, tools, or applications, and data structures and flowcharts, and graphical user interfaces, described in connection with FIGS. 1-7, as well as any operating system, file system and applications on a computer in FIG. 8, can be implemented using one or more processing devices of one or more computers with one or more computer programs processed by the one or more processing devices.

A computer program includes computer-executable instructions and/or computer-interpreted instructions, such as program modules, which instructions are processed by one or more processing devices or co-processing units in the computer. Generally, such instructions define routines, programs, objects, components, data structures, and so on, that, when processed by a processing device, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer system includes a database system with a query optimizer which records transformations used to generate a query execution plan. In another aspect, a computer system includes a database system with a query optimizer which replays recorded transformations for a previously generated query execution plan.

In another aspect, a computer-implemented process is performed by a database system with a query optimizer, where the process includes recording transformations used to generate a query execution plan. In another aspect, a computer-implemented process is performed by a database system with a query optimizer, where the process includes replaying recorded transformations for a previously generated query execution plan.

In any of the foregoing aspects, an input query is received in a declarative query language and the query execution plan includes instructions performed on the database to implement the input query.

In any of the foregoing aspects, the query optimizer can apply a plurality of transformations to a logical representation of the input query to generate expressions for the query execution plan. In some implementations, the query optimizer can use a top-down application of transformation rules as the plurality of transformations. In some implementations, the query optimizer can use a bottom-up application of transformations to query elements in the logical representation of the input query.

In any of the foregoing aspects, the query optimizer can store, for each application of a transformation from among the plurality of transformations, data indicative of the transformation applied, and respective bindings used by the transformation. The stored data can be associated with respective expressions generated by application of the transformation. A task identifier can be stored for each applied transformation. The query optimizer can extract, from the stored data, information indicative of transformations and bindings used to generate expressions in the query execution plan. To extract the information, the query optimizer can identify, for each expression in the query execution plan, each transformation applied to generate other expressions on which the respective expression is dependent. The query optimizer can further serialize the identified transformations in order as performed by the query optimizer.

In any of the foregoing aspects, when replaying recorded transformations, for each transformation to be applied to the input query, in response to the transformation being one of the recorded transformations used to generate expressions in an original query execution plan, the query optimizer can apply the transformation, and otherwise avoid applying transformations not used to generate expressions in an original query execution plan. If an error occurs by the query optimizer in attempting to use the recorded transformations, the query optimizer can perform query optimization without using the recorded transformations.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

The subject matter defined in the appended claims is not necessarily limited to the specific implementations described above. The specific implementations described above are disclosed as examples only.

What is claimed is:

1. A computer system, comprising:
a processing system accessing computer program instructions that, when executed by the processing system, configures the computer system to be comprising:
a database comprising a query optimizer having an input receiving an input query in a declarative query language and an output providing a query execution plan comprising instructions performed on the database, the query optimizer being configured to:
apply a plurality of transformations to a logical representation of the input query, a subset of the plurality of transformations being used to generate expressions for an original query execution plan;
store information for the original query execution plan for the input query, the stored information including, for each application of a transformation that was used to generate the expressions for the original query execution plan from among the plurality of transformations, data indicative of the transformation applied, and respective bindings used by the transformation indicating expressions input to the transformation;
in response to a subsequent optimization for the input query, receive the stored information for the original query execution plan for the input query;
for each transformation indicated in the stored information that was used to generate the expressions for the original query execution plan, apply the transformation; and
generate a query execution plan based on the applied transformations.

2. The computer system of claim 1, wherein, to store the information, the query optimizer stores a recorded lineage including, for each transformation used to generate the expressions for the original query execution plan, data indicative of an identifier of the transformation, identifiers of expressions used as respective bindings of the transformation, and an identifier of respective expressions generated by the transformation applied to the respective bindings.

3. The computer system of claim 2, wherein the query optimizer further uses a top-down application of transformation rules as the plurality of transformations.

4. The computer system of claim 2, wherein the query optimizer further stores, for each transformation used to generate the expressions for the original query execution plan, a unique task identifier.

5. The computer system of claim 1, further comprising:
the query optimizer extracting, from the stored information, information indicative of transformations and bindings used to generate expressions in the original query execution plan.

6. The computer system of claim 5, wherein, to extract the information, the query optimizer identifies, for each expression in the original query execution plan, each transformation applied to generate other expressions on which the respective expression is dependent.

7. The computer system of claim 6, wherein the query optimizer serializes the identified transformations in order as performed by the query optimizer.

8. A computer system comprising:
a processing system accessing computer program instructions that, when executed by the processing system, configures the computer system to be comprising:
a database comprising a query optimizer having an input receiving an input query in a declarative query language and an output providing a query execution plan comprising instructions performed on the database, the query optimizer being configured to:
receive stored information for an original query execution plan for the input query, the stored information including, for each application of a transformation used to produce an expression in the query execution plan, data indicative of the transformation applied and bindings for the transformation, the bindings indicating expressions input to the transformation;
for each transformation to be applied to the input query, in response to the transformation being indicated by the stored information, applying the transformation, and otherwise avoiding transformations not used to generate expressions in the original query execution plan.

9. The computer system of claim 8, wherein the stored information comprises a recorded lineage including, for each transformation applied to a logical representation of the input query, data indicative of an identifier of the transformation, identifiers of expressions used as respective bindings used by the transformation, and an identifier of respective expressions generated by the transformation applied to the respective bindings.

10. The computer system of claim 9, wherein the query optimizer further uses a top-down application of transformation rules as the plurality of transformations.

11. The computer system of claim 9, wherein the query optimizer further stores, for each transformation, a unique task identifier.

12. The computer system of claim 8, further comprising:
the query optimizer extracting, from the stored data, information indicative of transformations and bindings used to generate expressions in the query execution plan.

13. The computer system of claim 12, wherein, to extract the information, the query optimizer identifies, for each expression in the query execution plan, a respective transformation used to generate other expressions on which the expression is dependent.

14. The computer system of claim 13, wherein the query optimizer serializes the identified transformations in order as performed by the query optimizer.

15. The computer system of claim 8, wherein, in response to an error by the query optimizer in attempting to use the stored information in applying transformations, the query optimizer is configured to perform query optimization without using the stored information.

16. A computer-implemented process, performed by a computer comprising a processing system accessing computer program instructions that, when executed by the processing system, configures the computer to perform the process, comprising:

receiving, in a query optimizer of a database, an input query in a declarative query language;

receiving stored information for an original query execution plan for the input query, the stored information including, for each application of a transformation used to produce an expression in the original query execution plan, data indicative of the transformation applied and respective bindings for the transformation, the bindings indicating expressions input to the transformation;

for each transformation to be applied to the input query, in response to the transformation being indicated by the stored information, applying the transformation used to generate the original query execution plan; and generating a query execution plan based on the applied transformations.

17. The computer-implemented process of claim 16, wherein stored information comprises a recorded lineage including, for each applied transformation, data indicative of a respective identifier of the transformation, identifiers of expressions used as respective bindings of the transformation, and an identifier of respective expressions generated by the transformation applied to the respective bindings.

18. The computer-implemented process of claim 17, wherein applying the transformations comprises a top-down application of transformation rules to a logical representation of the input query.

19. The computer-implemented process of claim 18, wherein the stored information further comprises, for each transformation, a unique task identifier.

20. The computer-implemented process of claim 16, further comprising:
extracting, from the stored information, information indicative of transformations and bindings used to generate expressions in the original query execution plan.

* * * * *